United States Patent Office 3,357,886
Patented Dec. 12, 1967

3,357,886
ORAL ANTISEPTIC COMPOSITION CONTAINING 1,3,7-TRIAZABICYCLO [3.3.0] OCTANES
Freeman H. McMillan, Dover, N.J., assignor to Warner-Lambert Pharmaceutical Company, Morris Plains, N.J., a corporation of Delaware
No Drawing. Filed Aug. 20, 1964, Ser. No. 391,025
1 Claim. (Cl. 167—65)

This invention relates to a composition of matter useful in the treatment of microbial infections and relates more particularly to compositions useful in combatting bacterial infections and to a method for the use of such compositions in the treatment of such infections.

I have found that compositions containing an effective amount of a compound of the following structural formula:

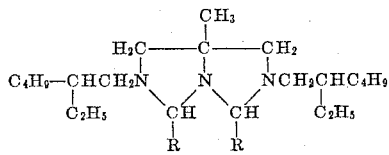

wherein R may be hydrogen, ethyl, N-butyl, N-hexyl or phenyl, are particularly useful and active as anti-microbial agents. When incorporated as an active ingredient in said compositions, these compounds exhibit potent antimicrobial activity against gram positive cocci and certain fungi. Thus, for example, at a concentration of about 0.5 mcg./ml. they have been found to inhibit the growth of *Staphylococcus aureus*.

The above compounds may be prepared in accordance with the procedure described in U.S. Patent No. 2,393,826.

Thus, they may be prepared by the reaction of 2-methyl-N$^1$, N$^3$-bis(2-ethylhexyl)-1,2,3-triaminopropane with aldehydes of the formula RCHO wherein R is as defined above, at a molar ratio of about 1:2. The starting material is generically disclosed in U.S. Patent 2,436,779. The reaction is effected by heating the starting materials with or without a solvent under reflux for about six hours at the end of which time the desired reaction product is recovered from the reaction mixture by distillation under a vacuum.

According to the present invention, there are provided novel and physiologically acceptable pharmaceutical compositions for the treatment and prophylaxis of bacterial infections which compositions are particularly effective against organisms commonly found in the oral cavity. These compositions comprise as active ingredients one or more compounds corresponding to the above formula in combination with non-toxic pharmaceutical excipients which compositions optionally contain also other known anti-microbial agents. These include compositions for oral or for local applications. The compositions of the invention for oral use comprise the stated active ingredients and such standard pharmaceutical excipients as are commonly used in the manufacture of oral dosage forms for human and veterinary medication. They include, for example, mouth washes, tablets, syrups, elixirs, and the like. Liquid formulations are most convenient because of the fact that the active ingredient is normally liquid. Generally, the compositions are so formulated that the active compounds is employed in a concentration of 0.1% to 1% in the selected pharmaceutical excipient or combination of excipients. For local applications these compositions may include, for example, from about 0.5% to 1% of the active ingredient in such standard excipients as are commonly used in the manufacturing of topical dosage forms such as creams, ointments, dusting powders, etc. For example, such excipients may include petrolatum, talc, lower alcohols and the like. Such compositions are particularly useful in treating local bacterial infections or where prophylactic treatment is desired. The above compositions may also contain other known antibacterial agents such as, for example, the penicillins, tetracycline, the sulfonamides and the like. They may also include flavoring, coloring and surface active agents. The compositions of the invention may also contain other known therapeutic agents such as, for example, anti-protazoal, anti-pruritic agents, anti-inflammatory as well as antihistamine agents.

The following examples are included in order to further illustrate the practice of this invention.

*Example 1*

In a round bottom flask are placed 6.54 g. (0.02 mole) of 2-methyl-N$^1$, N$^3$-bis(2-ethylhexyl)-1,2,3-triaminopropane, 25 ml. of methanol and 3.24 g. (0.04 mole) 37% formalin solution. The mixture is heated under reflux for six hours after which the solvent and water formed in the reaction are stripped off under vacuum. The residue is distilled under oil pump vacuum giving 4.5 of 2,6-(2-ethylhexyl)hexahydro-7a-methyl-1H-imidazo[1,5-c]imidazole boiling at 131°/0.025 mm. $n_D^{22}$ 1.4660. Gas-liquid chromatography indicates that the material is homogeneous.

*Analysis.*—Calcd. for $C_{22}H_{45}N_3$: C, 75.15; H, 12.9; N, 11.96. Found: C, 75.07; H, 12.9; N, 11.96.

*Example 2*

The effectiveness of 2,6-bis(2-ethylhexyl)hexahydro-7a-methyl-1H-imidazo[1,5-c]imidazole as an anti-microbial agent is demonstrated in the following test:

Two racks of 20 sterile Kahn tubes containing 1 cc. of tryptose phosphate broth having a pH of 7 are employed. The reference compound employed is hexetidine trihydrochloride. A 1% solution of the above compound is added to the first tube in each row and serially diluted 2-fold through the 9th tube. The 10th tube contains broth only and is the control. The same procedure is followed for the reference compound. Each tube is then inoculated with 0.1 ml. of 1:100 dilution of an 18 hour tryptose phosphate broth culture of *Staphylococcus aureus* M 250 making the final volume in each tube 1.1 ml. After thoroughly mixing the tube contents, the tubes are incubated for 48 hours at 37° C. Tubes are then read macroscopically for presence or absence of visible growth and results are reported as minimum inhibitory concentration ($\alpha$/ml.) test compound required to kill the test organism. The test compound has been found to have a minimum inhibitory concentration of 0.5 mcg./ml. against staphylococcus.

*Example 3*

An oral antiseptic formulation is prepared by simple blending procedures from the following ingredients.

Ingredients:
(1) 2,6 - bis (2 - ethylhexyl)hexahydro-7a-methyl-1H-imidazo[1,5-c]imidazole _g._ 1.00
(2) Ethyl alcohol _ml._ 100.00
(3) Formaldehyde solution, USP _ml._ 0.50
(4) Saccharin, sodium, USP _g._ 0.11
(5) Sodium cyclamate NF _g._ 1.14
(6) F D and C Red No. 2 _g._ 0.01
(7) D and C Red No. 33 _g._ 0.01
(8) F D and C Red No. 4 _g._ 0.035
(9) Citric acid USP _g._ 0.70
(10) Water, purified USP to make _ml._ 1000.00

The above oral antiseptic contains 0.1% by weight of the active ingredient. For use as an antiseptic mouth wash, for example, a dose of 5 to 10 cc. applied to the oral cavity two or three times a day is generally recommended.

It is to be understood that the foregoing detailed description is given merely by way of illustration and that many variations may be made therein without departing from the spirit of my invention.

Having described my invention, what I desire to secure by Letters Patent is:

An oral antiseptic composition which comprises as active ingredient from 0.1% to 1% by weight of a compound of the formula:

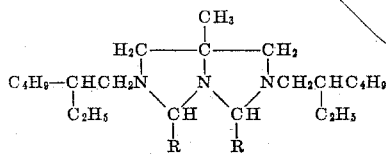

wherein R is a member of the group consisting of hydrogen, ethyl, hexyl, propyl and phenyl in combination with an inert pharmaceutical diluent.

References Cited

UNITED STATES PATENTS 2,393,826  2/1946  Senkus _____ 260—309
2,436,779  2/1948  Senkus _____ 260—583

ALBERT T. MEYERS, *Primary Examiner.*

JULIAN S. LEVITT, *Examiner.*

J. D. GOLDBERG, *Assistant Examiner.*